United States Patent

[11] 3,628,969

[72] Inventors Robert P. Vilim
 Piscataway;
 Harvey Bell, North Plainfield, both of N.J.
[21] Appl. No. 886,047
[22] Filed Dec. 17, 1969
[45] Patented Dec. 21, 1971
[73] Assignee National Starch and Chemical Corporation
 New York, N.Y.

[54] STARCH-MILK SYSTEMS STABILIZED WITH A BLEND OF HYDROXYALKYL STARCH AND CARRAGEENAN
4 Claims, No Drawings

[52] U.S. Cl.................................................. 99/139,
 99/124, 99/144
[51] Int. Cl....................................................... A23g 3/00

[50] Field of Search............................................. 99/139,
 144, 124, 131

[56] References Cited
UNITED STATES PATENTS

| | | | |
|---|---|---|---|
| 2,653,876 | 9/1953 | Hanson et al.................. | 99/144 X |
| 2,733,238 | 1/1956 | Kerr et al....................... | 99/139 X |
| 3,369,910 | 2/1968 | Ganz et al...................... | 99/139 |

Primary Examiner—Raymond N. Jones
Assistant Examiner—J. M. Hunter
Attorney—James and Franklin ABSTRACT: Starch and milk containing food products which are stable to high-temperature processing are prepared by admixing hydroxyalkyl starch and carrageenan to the components of the food product.

STARCH-MILK SYSTEMS STABILIZED WITH A BLEND OF HYDROXYALKYL STARCH AND CARRAGEENAN

This invention relates to food products containing starch and milk, and particularly to those products which are subjected to retorting or other high-temperature sterilization methods in the course of their manufacture. The invention pertains to the production of such starch and milk containing food products to render the same stable against the deterioration which is normally a result of high-temperature sterilization treatment.

In the past, preparation of high-quality starch and mild containing food products such as canned puddings, cream soups, sauces and gravies, has been complicated by problems arising as a result of the retorting process. The term "retorting" refers to the heating, under pressure, of the food products to temperatures above 212° F. in order to sterilize said products. AFter being retorted these products commonly exhibit poor texture and viscosity stability, discolorization and off flavors due to nonenzymatic browning, discolorization and off-flavors due to carmelization of available sugars, and incipient curdling of the milk proteins.

Various attempts have been made in the past to improve product texture and stability. Typical methods which have been proposed involve the use of starches, either alone or in conjunction with carrageenan or other gums. The result of these techniques in the past has been minor improvement in texture. However, the occurrence of carmelization and incipient curdling was not eliminated by these procedures.

It is, thus, the prime object of this invention to prepare retorted starch-milk systems which do not exhibit poor texture and stability, incipient curdling of milk protein, or discoloration and off-flavors due to carmelization and nonenzymatic browning. Various other objects and advantages of the invention will become apparent from the following description thereof.

We have found, surprisingly, that the use of a starch which has been etherified with sufficient alkylene oxide so as to have a minimum degree of substitution of 0.056, in conjunction with a carrageenan, in a starch-milk system, yields a finished product which is not only stable at normal cooking temperatures, but even after high-temperature retorting is characterized by the absence of discoloration and off flavors due to carmelization as well as nonenzymatic browning, and a lack of incipient curdling of the milk protein. By degree of substitution (D.S.) we mean the average number of substituent groups per anhydroglucose unit of the starch molecule. It is believed that it is the relatively high degree substitution of alkylene oxide onto starch used in the practice of our invention that leads to these significant improvements over the prior art.

By alkylene oxide we refer to any of the epoxides of lower aliphatic hydrocarbons in which the oxygen is linked to adjacent carbon-hydrogen groups. After etherification with the alkylene oxide the starch is referred to as a hydroxyalkyl starch. The hydroxyethyl starches preferred for use in our invention are the hydroxyethyl and hydroxypropyl starches. Any type of starch may be used in the preparation of these hydroxyalkyl derivatives. However, it is preferable to utilize previously cross-linked starches from corn, waxy maize, tapioca, or wheat. The hydroxyalkyl starch should be present at a weight concentration of 2–7 percent of the total food product.

The hydroxyalkyl starch can be prepared by any of the various processes known to the art. A typical procedure is that described in U.S. Pat. Nos. 2,516,632, 2,516,633 and 2,516,634 dated July 25, 1950. As indicated hereinabove, however, it is required that the etherified starch used in the process of our invention have a D.S. of at least about 0.056.

Besides the hydroxyalkylated starch, the other essential ingredient necessary in the product and process of our invention is carrageenan. While the practice of the invention is not limited as to the type of carrageenan employed, it is preferred that the carrageenan be the relatively pure natural gum and not one of the blends with other natural gums known under various trade names. Based on a 1 percent to 10 percent weight concentration of milk solids in the total formula, the preferred range for carrageenan is between 3.5 percent and 7.1 percent, by weight, of the total hydroxyalkyl starch present. At less than 3.5 percent a significant increase in undesirable features such as off-colors and curdling may occur. At greater than 7.1 percent resultant viscosities are excessively gelled and product body has been found to be rubbery in texture.

In preparing the food products typical of this invention the addition of fats or vegetable oil is often desirable (although not essential to our invention) in order to obtain desired mouth feel and flavor characteristics for particular food formulations. Other optional ingredients such as emulsifiers, sweeteners, colors and flavors may be added, depending on the requirements of the finished product, without hindering the desired results.

The recommended total solids level in the finished food products ordinarily ranges from about 25 percent to 35 percent, by weight. Higher levels of solids tend to result in products too heavy in viscosity for ready heat sterilization. Lower levels of solids result in products with too thin a body for most purposes. However, the level of solids does not affect the stabilization produced by our invention.

The preferred procedure of preparing the food products of this invention involves dry blending all dry ingredients and then addition of the blend to room temperature liquid. However, the dry mix can be added to either hot or cold liquid, if necessary. The addition of carrageenan alone with no dry diluent is normally impractical. The hydroxyalkylated starch can be added alone if desired either in hot or cold liquids. Milk can be used in its whole liquid from or as dry skim milk powder. As a liquid it is best mixed with the water to which dry ingredients are added. Fat can be added with emulsifiers either as a previously formed oil-in-water emulsion added with the other liquids, or individually. If added individually, it is recommended that the whole product be subjected to colloidal milking or homogenizer shear before retorting, to ensure stability of the emulsion. The system is generally then heated to temperatures in the 185° F. to 195° F. range. The product is then sealed in cans or jars and retorted to sterility, the retorting time varying with the viscosity of the system, can size, and retort temperature. The usual treatment is 245° F. to 250° F. at 15 p.s.i.g. pressure for the time necessary for sterility. Typical examples of the finished products are canned puddings, cream fillings or other similar desert items, cream soups, sauces and gravies.

It should be emphasized that the above described general procedures for preparing food products is in no way intended as a limitation upon the scope of our invention, since formulas and methods for preparing canned foods which contain starch as well as milk are well known in the art. The essence of our invention is the addition to such foods of a hydroxyalkyl starch ether having a D.S. of at least 0.056 percent, together with carrageenan, in the specified proportions.

In the following examples, which further illustrate the embodiment of this invention, all parts given are by weight unless otherwise specified.

EXAMPLE I

This example illustrates the preparation of a pudding typical of the products of this invention. The following ingredients were utilized in the preparation of the product in this example:

| | Parts |
|---|---|
| Water | 53.05 |
| Emulsion System (as described hereinbelow) | 25.00 |
| Vanilla Powder | 2.20 |
| Sugar | 13.45 |
| Nonfat Dry Milk Solids | 2.50 |
| Salt | 0.20 |
| Hydroxyalkyl starch: Waxy maize cross- | 3.40 | linked with 0.03 parts, by weight, of phosphorus oxychloride according to U.S. Pat. No. 2,328,537 and with propylene oxide to the D.S. listed in Table I below Carrageenan    From 0.12 to 0.28
               (See Table I below)*

*This range of 0.12 to 0.28 parts of carrageenan corresponds to the range of 3.5 percent to 7.5 percent of carrageenan based on the weight of the starch.

As stated above, a previously formed emulsion system yields optimum results for long term product stability. This is not a necessary step in our invention but a recommended step in obtaining optimum quality. The above emulsion system was formulated as follows:

| | |
|---|---|
| Water | 69.35 |
| Fat (coconut oil with lecithin) | 20.00 |
| Corn Syrup Solids | 6.50 |
| Nonfat Dry Milk Solids | 3.00 |
| Purity Gum 539 (pregelatinized waxy maize starch as sold by National Starch and Chemical Corp.) | 0.75 |
| Emulsifier (blend of mono- and diglycerides) | 0.40 |

This fat emulsion system was mixed and homogenized before being added to the final formulation. The total mixture was brought to 195° F., canned in 211 mm. × 300 mm. cans and retorted for 60 minutes at 245° F.

The following table illustrates the result of varying the D.S. of propylene oxide onto starch, and of varying the amount of carrageenan in the above preparation.

TABLE I

| Formulation | #1 | #2 | #3 | #4 | #5 | #6 |
|---|---|---|---|---|---|---|
| Starch | 0.040 D.S. | 0.056 D.S. | 0.056 D.S. | 0.056 D.S. | 0.14 D.S. | 0.14 D.S. |
| Carrageenan | 0.24 parts. | 0.12 parts. | 0.24 parts. | 0.28 parts. | 0.12 parts. | 0.24 parts. |
| Results observed | Sl. browning, sl. curdling. | Smooth, no off-color or flavor. | Smooth, no off-color or flavor. | Heavy, cohesive, sl. incipient curdling. | Smooth, no off-color or flavor. | Smooth, no off-color or flavor. |

1—below minimum D.S. of hydroxyalkyl on starch; maximum amount of carrageenan.

2—amount of carrageenan.

3—minimum D.S.; maximum amount of carrageenan.

4—minimum D.S.; greater than maximum amount of carrageenan.

5 & #6—higher levels of D.S. with minimum and maximum amounts of carrageenan, respectively.

The desired results are obtained in samples No. 2, 3 5 and 6 where the D.S. is 0.056 or higher and the carrageenan to starch ratio is between 3.5 percent (0.12 parts of carrageenan) as in sample No. 2, and 7.1 percent, (0.24 parts carrageenan) as in sample No. 3.

EXAMPLE II

In this example the same procedure as example I is followed except that the hydroxyalkyl starch is omitted from formulations 3 and 4, and the carrageenan levels are varied. The following table summarized the results:

| Formulation | 01 | 02 | 03 | 04 |
|---|---|---|---|---|
| Hydroxyalkyl Starch (Waxy Maize | 3.40 | 3.40 | 0 0.14 D.S.) | 0 |
| Carrageenan | 0.20 parts | 0 | 0.20 parts | 0.50 parts |
| Results observed | No off-colors or flavors, smooth | Browning, curdling and off flavors | Browning, curdling, | Browning, separation of oil and water phases |

This example shows that both the hydroxyalkyl starch and the carrageenan must be present in order to realize the benefits claimed in our invention.

EXAMPLE III

The procedure of example I was repeated except that the hydroxypropyl starch used herein was prepared from different starch bases.

TABLE II

| Formulation | #2 | #3 | #3 | #4 | #5 | #6 |
|---|---|---|---|---|---|---|
| Starch | 0.056 D.S. | 0 | 0.056 D.S. | 0 | 0.056 D.S. | 0. |
| Carrageenan | 0.12 parts. | 0.12 parts. | 0.12 parts. | 0.12 parts. | 0.12 parts. | 0.12 parts. |
| Results observed | Smooth, no off-color or flavor. | Browning, off-flavor curdling. | Smooth, no off-color or flavor. | Browning, off-flavor curdling. | Smooth, no off-color or flavor. | Browning, off-flavor, curdling. |

1—minimum D.S. on waxy maize base.

2—waxy maize base, cross-linked starch not treated with hydroxyalkyl.

3—minimum D.S. on tapioca base.

4—tapioca base, cross-linked without hydroxyalkyl.

5—minimum D.S. on corn base.

6—corn base, cross-linked without hydroxyalkyl.

These results show that various types of starches can be successfully utilized for our invention.

EXAMPLE IV

The procedure of example I was repeated except that the hydroxyalkyl starch used herein was a hydroxyethyl ether corn starch.

| Sample | D.S. of Starch | Results Observed |
|---|---|---|
| A | 0.040 | Browning, curdling off-colors |
| B | 0.060 | Smooth, light color |

Summarizing, it is seen that this invention provides a means of obtaining starch and milk containing food products which are stable to high-temperature processing. Variations may be made in materials, proportions and procedures without departing from the scope of this invention.

We claim:

1. A method for preparing a food product containing starch and milk of the type which is subjected to retorting in the course of its manufacture which comprises the steps of:

A. admixing with said food product, carrageenan and a hydroxyalkyl starch having a degree of substitution of at least about 0.056, and B. retorting the resultant food product at temperatures above 212° F. for a period of time sufficient to sterilize said product, wherein said hydroxyalkyl starch is present in an amount of from about 2 to 7 percent, by weight, based on the total weight of the food product, and the carrageenan is present in an amount of from about 3.5 to 7.1 percent, by weight, based on the dry weight of the hydroxyalkyl starch.

2. A food product containing starch and milk which is characterized by its stability against degradation at high temperatures, said food product containing carrageenan and a hydroxyalkyl starch having a degree of substitution of at least about 0.056, wherein said hydroxyalkyl starch is present in an amount of from about 2 to 7 percent, by weight, based on the total weight of the food product, and the carrageenan is present in an amount of from about 3.5 to 7.1 percent, by weight, based on the dry weight of the hydroxyalkyl starch.

3. The food product of claim 2 retorted at temperatures above 212° F. for a period of time sufficient to sterilize said product.

4. The food product of claim 2, wherein said hydroxyalkyl starch is selected from the group consisting of hydroxyethyl starch and hydroxypropyl starch.

* * * * *